United States Patent [19]

Hautemont

[11] Patent Number: 4,591,327
[45] Date of Patent: May 27, 1986

[54] DEVICE FOR LAYING AND PREFORMING A SECTION OF WEB AND MOULDING UNIT ASSOCIATED WITH SUCH A DEVICE

[75] Inventor: Jean-Claude Hautemont, Gyf-sur-Yvette, France

[73] Assignee: Erca Holding, S.A.R.L., Les Ulis, France

[21] Appl. No.: 501,770

[22] Filed: Jun. 7, 1983

[30] Foreign Application Priority Data

Jun. 14, 1982 [FR] France ............... 82 10355

[51] Int. Cl.$^4$ ............................... A01J 21/02
[52] U.S. Cl. ..................... 425/305.1; 425/306; 425/324.1; 425/383; 425/503; 425/522; 425/537
[58] Field of Search ............... 425/388, 503, 292, 443, 425/324.1, 305.1, 510, 296, 306, 503, 441; 156/500, 74, 294

[56] References Cited

U.S. PATENT DOCUMENTS

| 3,709,643 | 1/1973 | Nasica | 425/510 |
|---|---|---|---|
| 3,904,345 | 9/1973 | Lechevallier | 425/510 |
| 4,038,854 | 8/1977 | Jones | 72/209 |
| 4,059,377 | 11/1977 | Corbic | 425/443 |
| 4,130,386 | 12/1978 | Hautemont | 425/383 |
| 4,134,717 | 1/1979 | Philippon et al. | 425/383 |
| 4,370,118 | 1/1983 | Dronet | 425/305.1 |
| 4,452,580 | 6/1984 | Dronet | 425/397 |

FOREIGN PATENT DOCUMENTS

| 2339474 | 1/1976 | France . |
|---|---|---|
| 2342145 | 2/1976 | France . |
| 2340192 | 2/1976 | France . |
| 2340185 | 2/1977 | France . |

Primary Examiner—Willard E. Hoag
Attorney, Agent, or Firm—Scully, Scott, Murphy & Presser

[57] ABSTRACT

The invention relates to a device for laying and preforming a section of web in a forming mould which is provided at a container thermoforming station. The shaping member is mounted to move between, on the one hand, a lower position corresponding either to the position of closing (obturation) of the bottom opening in the forming chamber when the moulding unit occupies its thermoforming position, or to the median zone of the forming chamber when said unit occupies the stripping position and, on the other hand, an upper position corresponding to the median zone of said forming chamber when the moulding unit occupies the thermoforming position. An annular slot for passage is defined between the lateral face of the shaping member and certain corresponding parts of the lateral face of the forming chamber in the median zone thereof. The transfer piston is adapted to penetrate in the forming chamber.

27 Claims, 22 Drawing Figures

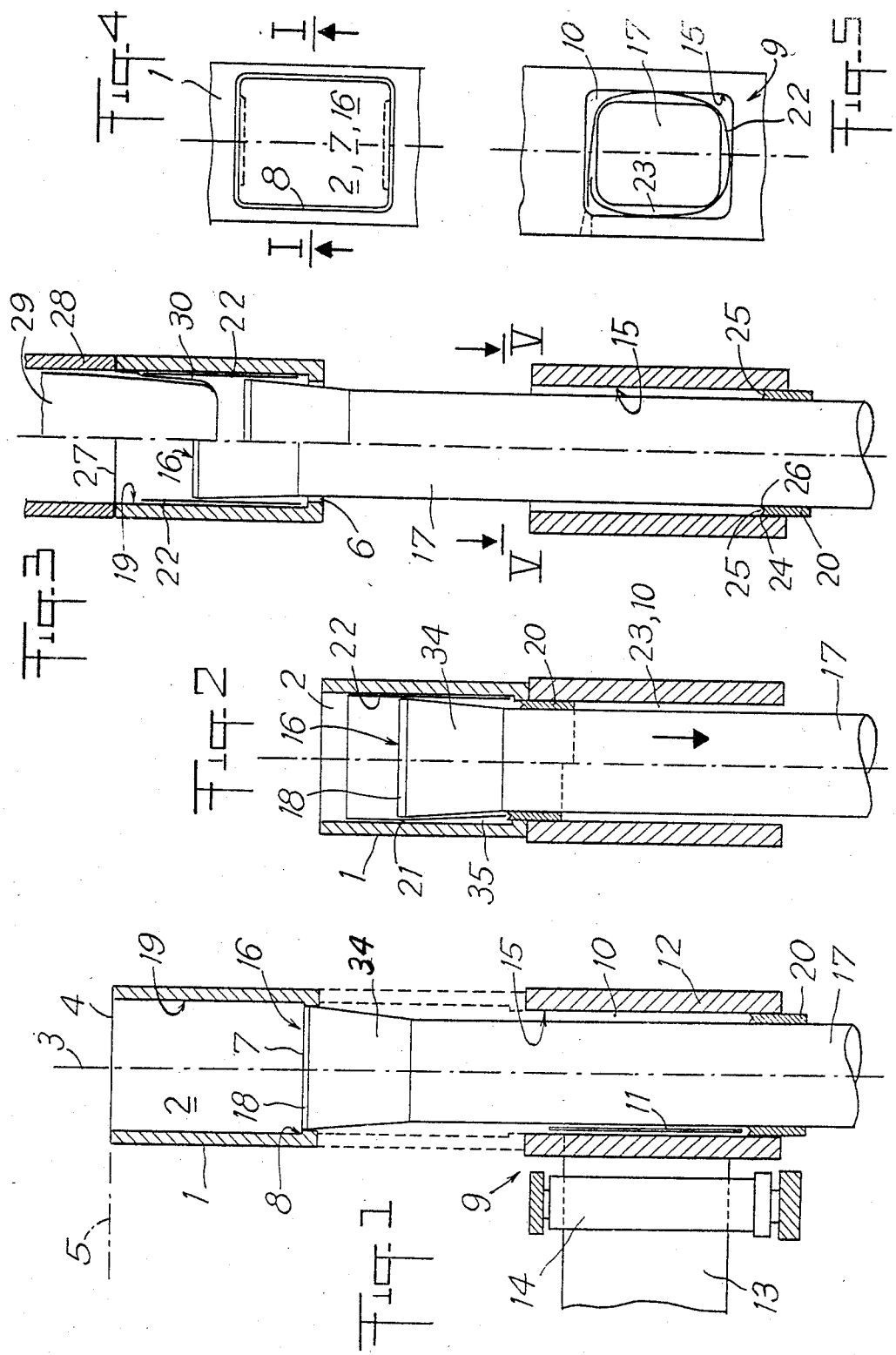

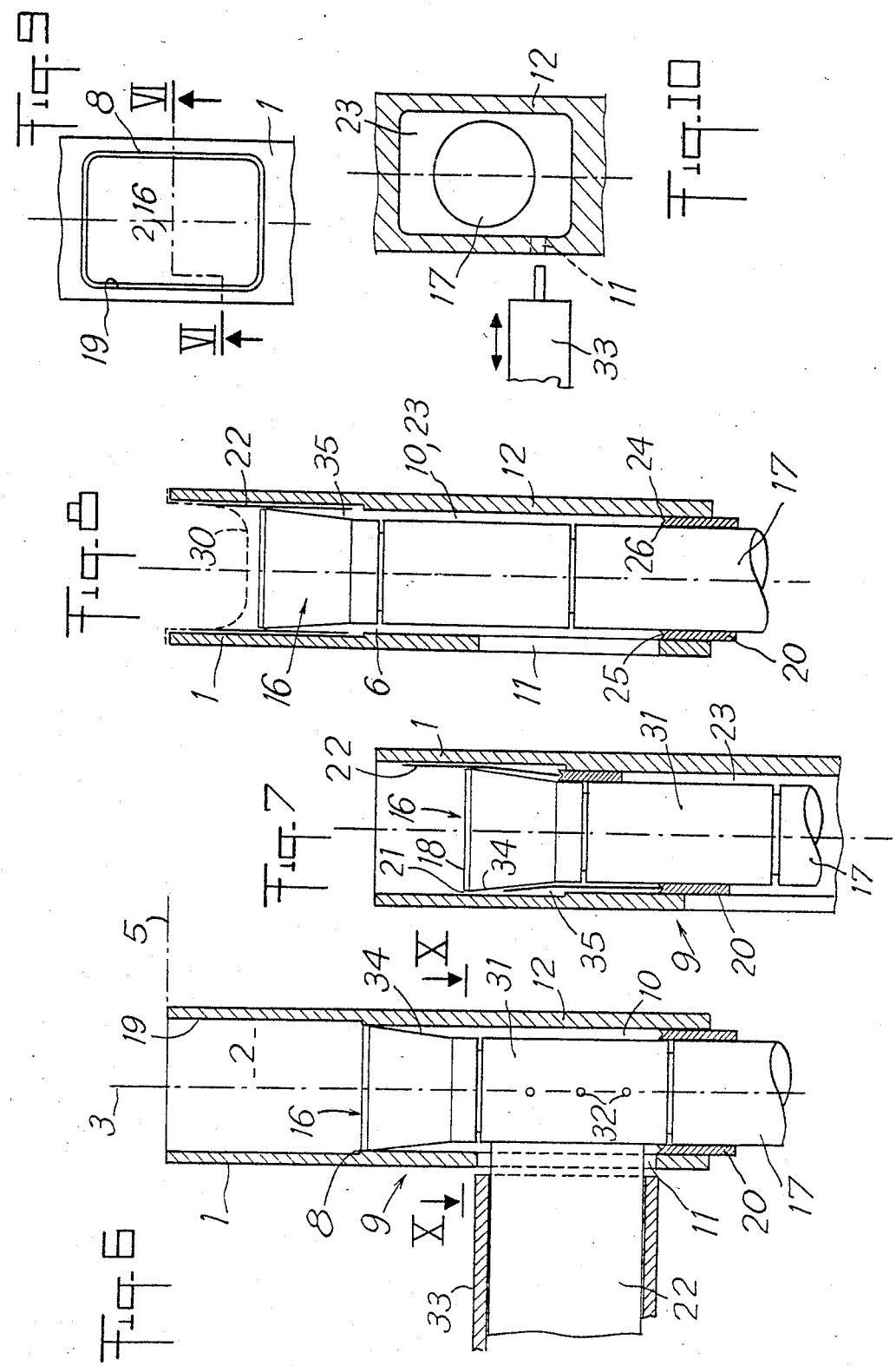

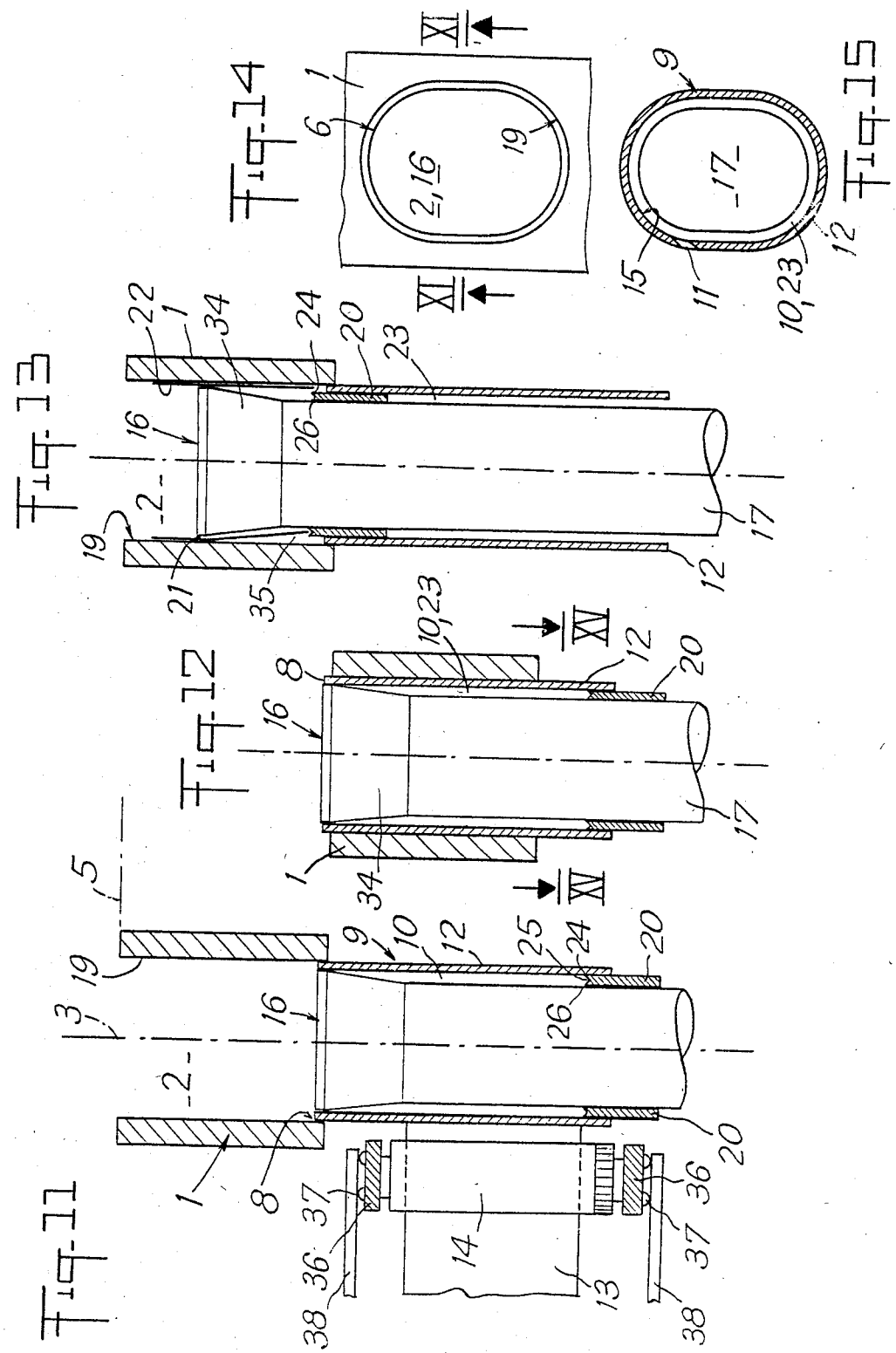

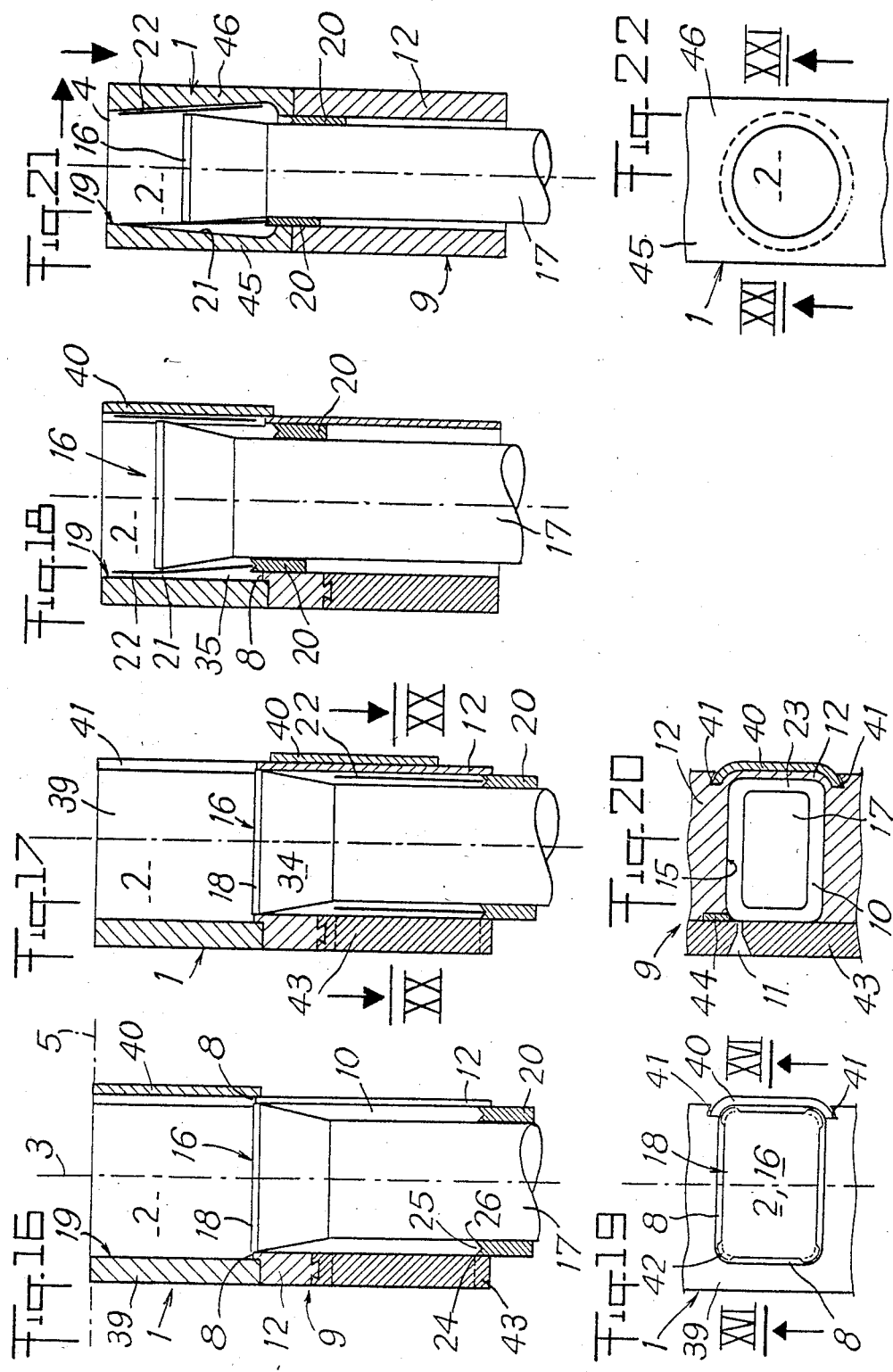

DEVICE FOR LAYING AND PREFORMING A SECTION OF WEB AND MOULDING UNIT ASSOCIATED WITH SUCH A DEVICE

The present invention relates to a process for laying and preforming a section of web whereby a section of web having a heat-sealing face is introduced and wound in a pre-wind cavity, the section of web is transferred from said pre-wind cavity to a chamber for forming a thermoplastics recipient through a bottom opening therein and said section of web is applied against the lateral face of said chamber where it is retained by an appropriate means until it is overmoulded from the inside by the thermoplastics material in sheet form from which said recipient whose lateral wall is coated with said section of heat-sealing web is thermoformed.

One drawback of the known process, for example as disclosed by French Pat. No. 76 13433 (2 350 150) resides in the fact that the speed of shaping is directly connected with the speed of rise of the forming chamber from its lower stripping position to the upper thermoforming position and that the shaping of the section of web which has been transferred to the forming chamber while the latter occupied its stripping position, is effected while the section of web remains in abutment against a lower shoulder of the forming chamber, which shoulder surrounds at least partially the bottom opening therein. Consequently, the forces of application produced during the rise of the forming chamber by an immobile base plate adapted to obturate the bottom opening, in front of which the section of web must move away laterally, also comprise a vertical component of compression, particularly at the beginning of the shaping operation, which frequently provokes creasing or crumpling of said section of web.

French Pat. No. 76 32222 (2 369 074) also discloses a process of shaping whereby the speed of shaping is independent of the speed of rise of the forming chamber towards its thermoforming position. However, in this case, the speed of shaping is connected with the speed of the punch for forming the thermoplastics recipient and, in addition, the section of web cannot be introduced into the forming chamber through the bottom opening therein.

It is an object of the invention to propose a process of the above type which avoids these drawbacks.

This object is attained in that, after having cleared the bottom opening of the forming chamber, the section of web is introduced into said chamber maintained immobile while at least the upper part of the section of web is simultaneously shaped and applied against the lateral face of said chamber.

In this way, it is possible to render the speed of shaping independent of that of the rise of the forming chamber and to adapt this speed to the mechanical strength of the section of web.

The section of web is shaped either when the forming chamber is in low stripping position or in high thermoforming position and shaping means are used to maintain the section of web in place and in its shaped position until it is overmoulded (from the inside) by the thermoplastics material of the recipient.

The invention also relates to a device for laying and preforming a section of web, decorative or not, in a forming mould which is provided at a recipient thermoforming station, possibly incorporated in a machine for packing a product, and which comprises a moulding unit comprising at least one upwardly open forming chamber of vertical axis, presenting, at its lower end, an opening adapted to be obturated by a bottom plate mobile with respect to said moulding unit of which at least a part is adapted to move between a high, so-called thermoforming position and a low, so-called stripping position of the recipients, device of the type comprising:

a unit for pre-winding the section of web, said unit provided with a cylindrical pre-wind cavity open at least towards the forming chamber, adapted to be able to receive, laterally, a section of heat-sealing web and disposed so as to be located below the moulding unit and in alignment with said forming chamber which comprises at least one inner shoulder defining the bottom opening of said chamber and extending perpendicularly to the vertical axis and towards the inside of said chamber at the most until it is plumb with the lateral face of the pre-wind cavity;

a shaping member which is mounted on a support rod and constituted by the bottom plate of the forming chamber, presents a cylindrical lateral face of which the transverse section at the bottom plate is similar to but less than that of said forming chamber, with the result that the distance between the lateral cylindrical face of the shaping member and the lateral face of the forming chamber is at least equal to the thickness of the section of web, and which is adapted to penetrate in the forming chamber and to apply said section of web and to maintain it applied against the lateral face of said forming chamber, and a transfer member such as an annular piston, connected to a control rod and mounted to slide in the pre-wind cavity about the rod supporting the shaping member.

Such a device for laying and preforming a section of web is known, for example, by French Pat. No. 76 13433 (2 350 190).

Among the drawbacks of this known device, mention should be made of a frequent crumpling of the section of web during the ascending movement of the forming chamber and of the section of web retained by the inner shoulder thereof and applied against the inner face of the forming chamber under the action of the shaping member with respect to which move the forming chamber and the section of web over a distance at least equal to the height of the forming chamber. Crumpling of the sections of web leads to cramming of the forming chamber in which the sections of web become jammed, rendering impossible any subsequent thermoforming of the recipients. Crumpling of the sections of web is thought to be due to too slow a displacement and too long a path of the section of web in front of the shaping member. The fact of compressing the section of web between two points (bottom plate at the upper end of the forming chamber—inner shoulder at the lower end thereof) which are fairly remote from each other, promotes the transverse buckling of the section and consequently crumpling thereof. This defect accentuates as the height of the forming chamber and the width of the sections of web increase, all the more so as the weight of the moulding unit increases and must consequently be moved more slowly between the two extreme positions of said unit.

One of the purposes of the present invention is to overcome this drawback and to propose a device in which the introduction of the section of web in the forming chamber and the shaping of said section are effected simultaneously, the speed of introduction and of shaping of the section of web in the forming chamber and the application of said section against the lateral face of said chamber having to be independent of the movement of displacement of the forming chamber and/or of the shaping member.

It is another purpose to ensure that the shaped section of web is maintained applied against the lateral wall of the forming chamber during overmoulding of the section of web by the thermoplastics band which will subsequently constitute the thermoformed recipient, the section of web having to be maintained against the lateral face of the forming chamber without pneumatic means or other complicated means.

These aims are attained by the present invention in that the shaping member is mounted to move between, on the one hand, a lower position corresponding either to the position of obturation of the opening in the bottom of the forming chamber when the moulding unit occupies its high thermoforming position, or to the median zone of the forming chamber when said unit occupies the stripping position, and, on the other hand, an upper position corresponding to the median zone of said chamber when the moulding unit occupies the high thermoforming position, in that an annular slot for passage is defined between, on the one hand, the lateral face of the shaping member located at the level of the median zone of the forming chamber and, on the other hand, certain corresponding parts of the lateral face of the forming chamber in the median zone thereof when the shaping member is located at the level of the median zone of the forming chamber, the thickness of the slot being at least equal to the thickness of the section of web, and in that the transfer piston is adapted to penetrate at least in the lower part of the forming chamber when the moulding unit is located in the immediate vicinity above the pre-wind cavity.

Due to this conception, the section of web is shaped at the slot made in the forming chamber as it enters this chamber and passes through said slot, whilst remaining guided both along the shaping member and at its rear part still located in the pre-wind cavity, the speed of passage of the section of web being able to be chosen and adapted to the strength of said section. This system, due to which the transfer of the section of web from the pre-wind cavity to the forming chamber is effected simultaneously to the shaping of the section of web, ensures shaping of the lower part of the section of web without this part being obliged to pass through said slot. In fact, as soon as the section of web has been transferred entirely in the forming chamber and has left the pre-wind cavity and the transfer piston, its lower end moves away laterally and is applied against the lateral wall of the forming chamber in order automatically to take the position of alignment with the slot.

As soon as the transfer piston has stopped its ascending movement, the shaped section of web is maintained in its position due to its contact with the shaping member which remains in the median zone of the forming chamber up to the beginning of overmoulding of said section by a zone of thermoplastics band covering the upper opening of the forming chamber and subsequently constituting the thermoformed recipient, which member is then lowered downwardly until it obturates the bottom opening in said chamber, as the thermoforming of the recipient progresses in the direction of the bottom of said chamber. It is important, particularly for the forming chambers and therefore high recipients, that the volume of air enclosed in the upper part of the forming chamber between the bottom plate in upper position in which it defines with the lateral face of said chamber an annular slot for passage, and the part of thermoplastics band covering the upper opening of said chamber, be reduced with respect to the volume of air enclosed in the known systems and be able to escape during the thermoforming operation through the annular slot whilst applying the section of web against the lateral face of the forming chamber. During overmoulding of the section of web in the course of thermoforming of a recipient, the upper end of the section of web is rapidly retained and set in its shaped position so that the inner shoulder provided at the lower end of the forming chamber does not serve to retain the section of web during the descending movement of the shaping member. This makes it possible to provide an inner shoulder of very small width, just sufficient to take into account the fact that the bottom opening of the forming chamber and the shaping member must present transverse sections which move away from that of the lateral face of said chamber by a distance at least equal to the thickness of the section of web. Due to this advantage, the cylindrical pre-wind cavity may be given a configuration which is almost identical to that of the cylindrical forming chamber and of which the transverse sections are homologous and spaced apart from one another by a distance slightly greater than the thickness of the section of web.

To ensure guiding of the section of web not only in the pre-wind cavity but also in the lower half of the forming chamber during transfer and shaping of the section of web, it is advantageous to extend the annular guiding chamber existing between the lateral face of the pre-wind cavity and the support rod of the shaping member by an additional guiding chamber in the lower half of said forming chamber. To this end, it is provided tha the shaping member comprises below the bottom plate a truncated or pyramidal guiding wall only slightly inclined with respect to the vertical axis of the forming chamber and of the pre-wind cavity and connecting said bottom plate progresively and continuously to the upper end of the support rod of said shaping member, the axial height of the guiding wall of said shaping member being slightly less than the maximum depth of penetration of the shaping member in said forming chamber.

The present invention also relates to a moulding unit provided in a station for thermoforming a row of recipients from a thermoplastics band. The thermoforming station preferably forms part of an installation for packing a product, in which the recipients are firstly thermoformed in one or more rows in the thermoplastics band previously taken to its softening temperature, the cavities or recipients are filled, the openings of the recipients are sealed with a cover band and finally the filled and sealed recipients are cut out from the two webs either individually or in groups of recipients.

A known moulding unit is provided with a plurality of forming chambers of vertical axis which are upwardly open, extending in a row transversely to the direction of advance of the thermoplastics band through the thermoforming station, and which present, for each of them, a bottom plate mobile with respect to the lateral face of said chamber so as to clear, i.e. uncover, a bottom opening provided in said chamber. In the case which concerns the subject matter of the invention, the moulding unit is subdivided into two parts of which one, located on the rear side, considered in the direction of advance of the thermoplastics band and of the thermoformed recipients, is immobile and fixedly installed in the thermoforming position in which the upper opening of the chambers is located just below the path of the thermoplastics band and of which the other, located on the front side in said direction of advance, is mounted to move between the high thermoforming position and a low, so-called stripping position in which the thermoformed recipients may leave without obstacle the rear mould part by moving in the thermoplastics band in the direction of advance thereof. A device for preforming and depositing a section of web such as a wrapper, decorative or not, is associated with the moulding unit and is disposed therebelow. This device comprises shaping means provided with a wrapper pre-wind unit, means for cutting out a wrapper from one or more webs as well as means for transferring the wrapper in the corresponding forming chamber.

The moulding unit of the type described hereinabove is known for example by French Pat. No. 74 00409 (2 256 818).

In the case of the prior art, the bottom plates pivot downwardly and rearwardly about a horizontal axis to release the bottom openings in the forming chambers. Consequently, the wrapper preforming and depositing device is fairly remote from the moulding unit so that the mobile mould part and the wrapper transfer means must effect considerable strokes to ensure transfer of the wrapper from the pre-wind unit to the mobile mould part and then, via the latter, to the immobile mould part. This modus operandi is fairly slow and the duration of this cycle cannot be reduced below a certain minimum of time which is the longer as the axial height of the forming chambers is great.

According to the state of the prior art, a large part of the mould unit must be mobile as this part serves at the same time to transfer the wrapper which generally covers the whole circumference of the forming chamber. There is therefore always an appreciable mass to accelerate, to displace and to decelerate between the end positions of the mobile part of the mould unit, which part must moreover comprise wrapper holding means such as suction orifices to prevent an untoward displacement of the wrapper during its transfer.

Another drawback of the known mould unit resides in the fact that the wrapper made from two sections of web is completely preformed and set in its final form outside the forming chamber with the result that it must be positioned in said chamber with perfect recision if it is desired to avoid a lack of register between the preform of the wrapper and the shape of the thermoformed recipient in the forming chamber.

It has also been proposed to use the bottom plate to apply against the lateral face of the forming chamber the wrapper previously introduced therein (cf. for example French Certificate of Addition No. 77 03132 (2 340 185). In this case, the shaping of the wrapper in the forming chamber is effected with the aid of a bottom plate fixedly installed during the rise of the mould unit from the stripping position to the thermoforming position, the wrapper being retained in the forming chamber with the aid of an inner shoulder surrounding the bottom opening in said chamber and against which abuts the lower edge of said wrapper. One drawback of this known system resides in the frequent creasing or crumpling of the wrappers produced when said wrappers are shaped. Another drawback of the known system resides in the fact that it does not enable the wrappers to be given a shape whose transverse section presents a contour substantially different from the circle inscribed in said transverse section.

In the case of another moulding unit known, for example, by French Pat. No. 76 03100 (2 340 191), with a view to being able to adapt the transverse section of the shaped wrapper to transverse forms of section very different from the circular form, it has been proposed to provide, in the cylindrical cavity of the pre-wind unit, an annular guiding chamber defined by the lateral face of said cavity and the piece for bearing or supporting the bottom plate, and to give the forming chamber a transverse section which is only slightly greater than that of the pre-wind cavity and that of the bottom plate so that the inner shoulder defining the bottom opening in said chamber presents a much reduced width. This system which already presents considerable advantages over the other known systems, proceeds with preforming of the wrapper in the pre-wind unit, but requires in the forming chamber powerful suction means to suck the preformed wrapper against the lateral face of the forming chamber after its introduction therein.

Another moulding unit known by French Pat. No. 76 13433 (2 350 190) is associated with a device for preforming and depositing a section of web which comprises a transfer piston movable with respect to the bottom plate and serving to introduce said section of web in the forming chamber through the bottom opening therein. In this case, the bottom plate is used for the final shaping of the section of web and accessorily for maintaining the section of web in its shaped state when it has returned near the bottom opening in the forming chamber.

However, in this case, there are also the risks of creasing of the section of web and an extremely long transfer stroke of said section between the pre-wind cavity and the moulding unit in high thermoforming position. In addition, the section of web being maintained only at its lower end, it does not conserve the shaped state in its upper part.

It will be noted that the different embodiments of the device for preforming and depositing a section of web or a wrapper as described in the above-mentioned documents, with the exception of the embodiment according to French Pat. No. 74 00409 (2 256 818), cannot be combined with a moulding unit in two parts of which one permanently occupies the high thermoforming position. In fact, at the moment of introduction of the wrapper in the forming chamber, the bottom plate must be located above the opening in said chamber, which is impossible since the path of the thermoplastics band passes level with the upper opening in the forming chambers.

In addition, any large mobile part of the moulding unit requires a rigid support such as a pressure plate to immobilize this mobile part in its high position during the thermoforming operation, during which the countermould unit abuts strongly, with the interposition of thermoplastics band, against the upper face of the moulding unit. The heretofore necessary pressure plate leads to the reciprocating displacement of additional masses, which substantially reduces the speed of development of a cycle for forming and wrapping a recipient.

It is an object of the present invention to overcome the above-mentioned drawbacks and, starting from a subdivided moulding unit as mentioned hereinabove, to propose a moulding unit—preforming and depositing device assembly in which the masses in movement and the lengths of stroke of the mobile elements are considerably reduced and in which the final shaping of the wrappers or sections of web is effected inside the forming chambers and independently of the movement of the mobile part of the moulding unit, the shaping means having at the same time to allow the wrappers to be maintained in their shaped position until they are overmoulded by part of the thermoplastics band.

This purpose is attained, according to the invention, in that the shaping means further comprise:

(a) in the pre-wind unit, a cylindrical pre-wind cavity which is disposed coaxially to and directly below the corresponding forming chamber, which is open at least towards said forming chamber and which is defined by a lateral wall provided with a vertical slot for lateral access through which a section of web is introduced into said cavity of which the transverse section is inscribed without noteworthy lateral clearance in axial projection of that of the forming chamber, (b) in the forming chamber, the bottom plate which is vertically mobile between a low position in which it obturates the bottom opening in said chamber and a high position in which its lateral face defines with the lateral face of said chamber an annular slot for passage between a lower part and an upper part of said chamber and which is provided at the upper end of an axially mobile support rod passing through the pre-wind cavity, the width of said slot being at least equal to the thickness of the section of web, and (c) in the pre-wind cavity, an annular transfer piston which is mounted to move between the lower end of said cavity and the forming chamber so as to be able to penetrate in the lower part thereof and of which the upper part cooperates with the section of web so as to force it through said slot, pushing it by its lower edge, and in that the front part of the lateral wall of the pre-wind cavity is disposed inside the axial projection on the lateral face of the forming chamber so that it is adapted to be covered by the mobile front part of the moulding unit during the vertical descending movement thereof.

Due to the measures proposed by the invention, it is possible to reduce the masses in movement, to eliminate the mobile pressure plate, to considerably simplify the structure of the moulding unit and the elements associated therewith and to produce at a high rate thermoformed and wrapped recipients having a considerable height with respect to the other dimensions.

The invention will be more readily understood on reading the following description with reference to the accompanying drawings, in which:

FIGS. 1 to 3 are views in elevation of an axial section through a first embodiment of the laying and preforming device in different working positions, along line I—I of FIG. 4.

FIG. 4 is a plan view of FIG. 1.

FIG. 5 is a plan view of transverse section of the device along line V—V of FIG. 3.

FIGS. 6, 7 and 8 are views in elevation of a vertical axial section through a second embodiment of the laying and preforming device, along line VI—VI of FIG. 9.

FIG. 9 is a plan view of the device of FIG. 6.

FIG. 10 is a plan view of a horizontal section along line X—X of FIG. 6.

FIGS. 11 to 13 are views in elevation of a vertical axial section through a third embodiment of the laying and preforming device, along line XI—XI of FIG. 14.

FIG. 14 is a plan view of the device according to FIG. 11.

FIG. 15 is a plan view of a horizontal section along line XV—XV of FIG. 12.

FIGS. 16 to 18 are views in elevation of a vertical axial section along line XVI—XVI of FIG. 19 through a fourth embodiment of the laying and preforming device and combined with a moulding unit according to the invention.

FIG. 19 is a plan view of the device according to FIG. 16.

FIG. 20 is a plan view of a horizontal section through the device along line XX—XX of FIG. 17; and FIGS. 21 to 22 respectively show a view in elevation of a vertical axial section of a fifth embodiment along line XXI—XXI of FIG. 22, and a plan view of said device according to FIG. 21.

For greater simplicity, like elements or members used in one of the different embodiments of the laying and preforming device and of the moulding unit will be designated by the same references.

Referring now to the drawings, the laying and preforming device is provided in a station for thermoforming recipients, of which a moulding unit 1 has been shown, comprising at least one forming chamber 2 whose axis 3 is vertical and presents an upper opening 4 which, when the moulding unit 1 is in high, so-called thermoforming position, is located just below the plane of advance 5 of the thermoplastics band (not shown). It is through this upper opening 4 in the forming chamber 2 that a recipient is thermoformed in said chamber 2.

The moulding unit 1 is adapted to move between the high thermoforming position (FIG. 1) and a low, so-called stripping position (FIG. 2) to allow the recipient which has just been thermoformed, to be released from the forming chamber 2 whilst remaining attached to the thermoplastics band with which it will be advanced by one step.

At its lower end, the forming chamber 2 comprises an opening 6 (FIG. 3) adapted to be obturated by a bottom plate 7 which is mobile with respect to the moulding unit 1 and, consequently, with respect to the forming chamber 2. The bottom opening 6 of the forming chamber 2 is generally laterally defined by an inner shoulder 8 which extends perpendicularly to the vertical axis 3 and towards the inside of the forming chamber 2.

The device for laying and preforming a section of web, decorative or not, comprises a pre-wind unit 9 which is provided with a cylindrical pre-wind cavity 10 which is open at least towards the forming chamber 2. In addition, this pre-wind cavity 10 is adapted to receive laterally, for example through a vertical slot 11 made in the wall 12 defining said pre-wind cavity 10, a section of web which comes from a web 13 of which the front end is introduced into the cavity 10 with the aid of conveyor rollers 14, the end of web introduced into the cavity 10 being cut to a predetermined length, for example, at the slot 11 level with the lateral face 15 of the cavity 10 with the aid of two knives (not shown) so as to form a section of web. The structure and the mode of functioning of this system of introducing a web in a pre-wind cavity and of transversely cutting the end of said web in said cavity with the aid of knives are widely known and described in particular in U.S. Pat. No. 3,709,643, German patent application No. 1 704 091 and French Pat. Nos. 2 339 474, 2 340 191, 2 340 192, 2 342 145 and 2 350 190. It is therefore unnecessary to describe them in greater detail here.

As may be seen in the drawings, the pre-wind cavity 10 is located below the moulding unit 1 and is in contact therewith when it occupies its lower stripping position. In addition, the pre-wind cavity 10 is in alignment with the forming chamber 2 of which the inner shoulder 8 is at the most plumb with the lateral face 15 of the cavity 10 in order not to hinder transfer of the section of web from said cavity 10 towards the forming chamber 2.

The laying and preforming device also comprises a shaping member 16 which essentially comprises the bottom plate 7 of the forming chamber 2 and which is mounted on a support rod 17 mounted axially mobile so as to allow the shaping member which, consequently, is also mobile vertical, to occupy a lower position corresponding to the median zone of the forming chamber 2 when the moulding unit 1 occupies the stripping position (FIG. 2) and an upper position corresponding to the median zone of said forming chamber 2 when said moulding unit 1 occupies the high thermoforming position (cf. left half of FIG. 3). The shaping member 16 (bottom plate 7) presents a cylindrical lateral face 18 of which the transverse section at the level of the bottom plate 7 is similar to but smaller than that of the forming chamber 2 so that the distance between the lateral cylindrical face 18 of the shaping member 16 and the lateral face 19 of the forming chamber 2 is at least equal to the thickness of the section of web.

The laying and preforming device also comprises a transfer member 20, for example constituted by an annular piston connected to a control rod (not shown) and mounted to slide in the pre-wind cavity 10 about the support rod 17 of the shaping member 16.

When the shaping member 16 is located inside the forming chamber 2, in the median zone thereof, in immobile position (FIG. 2 and left-hand side of FIG. 3), an annular slot 21 for passage is defined between the lateral face 18 of the shaping member 16 and certain corresponding parts of the lateral face 19 of the forming chamber 2 in the median zone thereof. The width of the slot 21 is at least equal to the thickness of the section of web 22 and this width of slot preferably remains less than five times the thickness of the section of web 22. The length of stroke of the transfer piston 20 is such that, in starting position, it is located below the section of web introduced into the pre-wind cavity 10 and that, in upper end position, it penetrates in the forming chamber 2 when the moulding unit 1 is located immediately above the pre-wind cavity 10 (cf. for example left-hand side of FIG. 2).

The functioning of the first embodiment of the laying and preforming device will be readily understood. The end of a web, for example a decorative web 13, is introduced with the aid of rollers 14 into the pre-wind cavity 10 of the unit 9 and, after this end of web has been introduced over a sufficient length in order subsequently to line for example all the periphery of the lateral face 19 of the forming chamber 2, this web end is cut level with the cavity 10 so as to constitute a section of web 22 (FIG. 5). To facilitate winding of the section of web 22 in the pre-wind cavity 10 and to give said section a tubular shape already relatively close to that of the lateral face of the pre-wind cavity 10 and the forming chamber 2, the support rod 17 of the shaping member 16 presents a transverse section similar to that of the pre-wind cavity 10 and determines with the lateral face 15 of this cavity 10 an annular chamber 23 for guiding the section of web 22. The distance between the lateral face 15 of the cavity 10 and the lateral face of the support rod 17, i.e. the thickness of the guiding chamber 23, is equal at least to double the thickness of the section of web 22 and is preferably equal to a few millimeters, for example five millimeters. The moulding unit 1 is lowered into its stripping position with a view to releasing the recipient previously thermoformed and to allowing it to advance. At the same time or after the advance of the previously thermoformed recipient, the shaping member 16 and its control rod 17 are also lowered so that said member 16 occupies its lower end position in which its lateral face 18 is located in the median zone of the forming chamber 2 where the lateral face 18 defines with corresponding parts of the lateral face 19 of the chamber 2 a slot 21 for passage. The section of web 22 previously introduced and cut out in the pre-wind cavity 10 may then be introduced in the forming chamber 2 through the bottom opening 6 released under the action of the transfer piston 20 which pushes said section 22 through the slot 21. While the section of web 22 passes through the slot 21, it is shaped and progressively applied against the lateral face 19 of the forming chamber 2. To facilitate drive of the lower edge of the section of web 22 by the transfer piston 20, the upper front face of said piston 20 is provided with at least one guide lip 24 applied against the lateral face 15 of the pre-wind cavity 10. Of course, this lip is very short in height. In order better to grip the lower edge of the section of web 22, it may also be advantageous to provide on the front face of the transfer piston 20 an annular groove 25 located in the immediate vicinity of the lateral face 15 of the cavity 10 and defined by two lateral annular ribs forming guide lips 24 and 26 of which one is applied against the lateral face 15 of the cavity 10 and the other against the support rod 17. The bottom of the annular groove 25 receives and maintains the lower edge of the section of web 22 during the whole transfer stroke of the piston 20. Once the section of web 22 has been completely transferred into the forming chamber 2, the lower edge of the section of web remains laterally retained by the outer lip 24 of the piston 20 (cf. left-hand side of FIG. 2) and the lower half of the section of web 22 already placed in the forming chamber 2 can be applied against the lateral face 19 thereof only after a slight downward withdrawal of the piston 20 (cf. right-hand part of FIG. 2). The application of the lower half of the section of web 22 against the lateral face 19 of the forming chamber 2 is effected under the action of the internal return forces of said section which, at the slot 21, has already taken the configuration which was imparted thereto by the shaping member 16.

During the transfer of the moulding unit from its stripping position (FIG. 2) to the thermoforming position (FIG. 3), the section of web 22 remains maintained in position in the forming chamber 2 by the shaping member 16 which synchronously accompanies the ascending movement of the moulding unit 1. Consequently, the shaping member 16 replaces the inner shoulder 8 in its function which is performed in the known devices, which function consisted in retaining in place the section of web 22 in the forming chamber during the ascending movement of the moulding unit 1.

In thermoforming position, the thermoplastics band 27 previously heated to its softening temperature is clamped on the edge of the forming chamber 2 with the aid of a bell shaped element 28 inside which is housed a forming punch 29 which, when it moves towards the bottom of the forming chamber 2, forms the blank of the recipient 30 which, under the effect of the compressed air coming from the forming punch 29, will be applied against the lateral face 19 and the bottom plate 7 of the forming chamber 2 while overmoulding the section of web 22.

It will be noted that, from the beginning of the thermoforming operation, the blank 30 will adhere on the upper edge of the section of web 22 and will maintain it applied against the lateral face 19 of the forming chamber 2, so that, from that moment, the shaping member 16 may descend, preferably at the same speed as the forming punch 20, without it subjecting the section of web to efforts of compression or axial flexion capable of leading to the section 22 crumpling. On the contrary, during the descending movement of the shaping member 16 towards the bottom opening 6 (cf. right-hand part of FIG. 3), the section of web 22 can be exposed only to weak pulling forces possibly due to the friction of the shaping member 16 on said section 22.

FIGS. 6 to 10 show a second embodiment of the device for laying and preforming a section of web. In this case, the pre-wind unit 9 is fast with the moulding unit 1 and moves vertically therewith. The pre-wind cavity 10 is laterally accessible through the vertical access slot 11 made in the lateral wall 12 defining said pre-wind cavity 10. The support rod 17 of the shaping member 16 comprises at cavity 10 level, a winding mandrel 31 rotating about the axis 3 of the support rod 17 and presenting at least one vertical row of suction orifices 32. Opposite the access slot 11 is disposed a unit 33 for introducing and cutting out sections of web 22. The structure of this type of pre-wind unit with mandrel 31 and introducing the cut-out unit 33 is known, for example, by French Pat. Nos. 2 256 013 and 2 340 285. On the other hand, what is novel in this second embodiment, is the assembly of the unit 33 on a carriage horizontally mobile between a position of introduction located in the immediate vicinity of said access slot 11 and a position of withdrawal, for which the free space between said unit 33 and the lateral wall 12 of the pre-wind cavity 10 is sufficient to allow the moulding unit 1 to cover said wall 12 as well as the vertical mobility of the shaping member 16 even when the moulding unit 1 is immobile and the association of an annular piston 20 with the pre-wind cavity 10 to expel the section of web 22 and to transfer it into the forming chamber 2 while forcing it through the slot 21 made between the lateral face 18 of the shaping member 16 and the lateral wall 19 of said chamber 2 in the median zone thereof when the moulding unit 1 occupies its lower stripping position (cf. left-hand side of FIG. 7).

To facilitate transfer of the section of web 22 and the introduction thereof in the annular slot 21, the shaping member 16 advantageously comprises, below the bottom plate 7, a guiding wall 34 of truncated or pyramidal form, very slightly inclined with respect to the vertical and connecting said bottom plate 7 progressively and continuously to the upper end of the support rod 17. The axial height of the guiding wall 34 of the shaping member 16 is at least approximately equal to the maximum depth of penetration of the shaping member 16 in the forming chamber 2. The annular guiding chamber 23 existing between the lateral face of the pre-wind cavity 10 and the support rod 17 of the shaping member 16 is thus extended by an additional guiding chamber 35 in the lower half of the forming chamber 2.

The shaping member 16 synchronously accompanies the moulding unit 1 in its ascending movement towards its thermoforming position (cf. FIG. 8) in which the recipient blank 30 is thermoformed, which immediately applies the upper edge of the section of web 22 against the lateral face 19 of the forming chamber 2. As before, the shaping member 16 has descended in the direction of the bottom opening 6 in the forming chamber 2 as forming of the recipient from the blank 30 progresses. It is possible that, at first, the blank 30 descended more quickly than the shaping member 16 so that, during that time, a first important part of the volume of air is driven through the slot 21 and the remaining volume of air is evacuated only at the last instant of forming of the recipient.

A third embodiment of the device for laying and preforming a section of web is illustrated in FIGS. 11 to 15. The essential difference with respect to the embodiment previously described lies in the fact that the pre-wind unit 9 with its cavity 10 and its lateral wall 12 is fixedly disposed in the immediate vicinity below the high thermoforming position of the moulding unit 1 which is arranged and adapted to the shape of the periphery of the lateral wall 12 of the pre-wind cavity 10 so as to be able to cover said lateral wall 12 when it is in lower stripping position (cf. FIG. 12).

As may be seen in particular in FIGS. 14 and 15, the pre-wind cavity 10 is defined by a lateral wall 12 of which the periphery is inscribed without noteworthy lateral clearance in the axial projection of the transverse section of the bottom opening 6 in the forming chamber 2. Being given that, in the case of the embodiment shown, the forming chamber 2 has no inner shoulder 8 fast with its lateral face 19, the bottom opening 6 presents the same transverse section as that of the pre-wind cavity 10.

In order to give the section of web 22 introduced through the lateral access slot 11 into the guiding chamber 23 of the pre-wind cavity 10 a configuration which is as close as possible to the final configuration which it will have after its introduction into the forming chamber 2, the upper end of the lateral wall 12 defining the pre-wind cavity 10 will be used to constitute the inner shoulder 8 of the bottom opening 6 giving access to the forming chamber 2. In this case, the shaping member 16 is housed in the upper end of the pre-wind cavity 10. When the moulding unit 1 completely covers the lateral wall 12 of the pre-wind cavity 10, a fairly small thickness is chosen for this lateral wall 12 to avoid too great a distance between the lateral face 15 of the pre-wind cavity 10 and the lateral face 19 of the forming chamber 2 and to avoid too large a stroke of lateral extension of the section of web 22 during its introduction into the forming chamber 2.

As may be seen in particular in FIG. 12, the upper face of the shaping member 16 is located slightly above the inner shoulder 8 of the forming chamber 2 or, more precisely, the upper end of the lateral wall 12 of the pre-wind cavity 10.

In the present case, the lower position of the shaping member 16 corresponds to the position of obturation of the bottom opening 6 of the forming chamber 2 when the moulding unit 1 occupies its thermoforming position (FIG. 11). The shaping member 16 may therefore remain in place whilst the moulding unit 1 descends into its stripping position (FIG. 12) in which it covers, without noteworthy lateral clearance, the lateral wall 12 of the pre-wind cavity 10.

When the moulding unit 1 rises into its thermoforming position (FIG. 13) after the advance by one step of the row of recipients or of the recipient which has just been thermoformed, the shaping member 16 may rise with said moulding unit 1 and, preferably, synchronously with the lower half of the forming chamber 2. The additional guiding chamber 35 is thus formed, which follows the upper end of the annular guiding chamber 23 of the pre-wind unit 9, between the lateral face 19 of the forming chamber 2 and the guiding wall 34 of the shaping member 16. This annular guiding chamber 35 established in the lower half of the forming chamber 2 narrows progressively upwardly up to the slot 21 for passage. Of course, this additional guiding chamber 35 exists only when the shaping member 16 is located in the forming chamber 2 and in particular in the median zone thereof.

As may be seen in particular in FIG. 11, the pairs of introduction rollers 14 located in the immediate vicinity of the corresponding access slot 11 made vertically in the lateral wall 12 of the pre-wind cavity 10 are supported by horizontal transverse bars 36 which, via wheels 37, are mounted on guide rails 38 extending parallel to the direction of advance of the thermoplastics band. The bars 36 with their wheels 37 form support carriages which are mobile horizontally between a position of introduction in which the pairs of rollers 14 are located in the immediate vicinity of the access slot 11, and a position of withdrawal in which the free space between the introduction rollers 14 and the lateral wall 12 of the pre-wind cavity 10 is sufficient to allow the moulding unit 1 to descend and cover said lateral wall 12. The assembly of the introduction rollers 14 on mobile support carriages is already known, for example by Utility Model 2 206 168 and by French Pat. No. 2 403 177. There is therefore no need to describe it in greater detail here.

As may be seen in particular in FIG. 13, the position of the section of web 22 in the forming chamber 2 with respect to the lower and upper ends thereof is determined by the depth of penetration of the transfer piston 20 in said forming chamber 2 and by the height of said section of web 22. Taking into account the fact that the lower end of the section of web is retained by the front lip 24 against any lateral displacement towards the outside, this lower end of the section of web 22 can be disengaged from the transfer piston 20 only after a slight recoil of said piston (right-hand side of FIG. 13).

In place of the introduction rollers 14 adapted to recoil in order to leave room for the moulding unit 1 when it descends into stripping position (FIG. 12), pairs of fixed introduction rollers may also be provided, as in the case of FIG. 1. The embodiment shown in FIGS. 11 to 15 will then be modified so that the pre-wind unit 9 is extended downwardly to allow the assembly of the pairs of fixed introduction rollers 14, the access slots 11 and the system for transversely cutting the sections of web 22 below the stripping position of the moulding unit 1 (cf. FIG. 1). In this case, the lower part of the pre-wind unit 9, of which part the lateral wall 12 will not be covered by the moulding unit 1, will serve to pre-wind the sections of web 22 while the upper part of said unit 9, of which upper part the lateral wall 12 will be covered by said moulding unit 1, will serve only to transfer and guide said sections of web 22.

FIGS. 16 to 20 show a fourth embodiment of the device for laying and preforming a section of web. In this case, a moulding unit 1 is used which comprises a fixed part 39 permanently occupying the high thermoforming position and a mobile part 40 adapted to move between the high thermoforming position and the low stripping position (FIGS. 16 and 17). The fixed part 39 of the moulding unit 1 is disposed to the rear in the direction of advance of the thermoplastics band so that it does not hinder the recipient which has just been thermoformed in its advance movement, while the mobile part 40 of the moulding unit 1 is located towards the front and on the path of advance of the recipient and must therefore be lowered into stripping position to clear the path of advance of said recipient. Moulding units in two parts of which one part is mobile with respect to the other between a thermoforming position and a stripping position, moulding units associated with a device for preforming and depositing a section of web or a wrapper, decorative or not, device comprising shaping means, are known, particularly by French Pat. No. 2 256 818. According to the state of the art known by French Pat. No. 2 256 818, the shaping means comprise a unit for pre-winding the sections of web or wrappers, means for cutting said sections from a web and means for transferring the sections of web into the forming chambers.

A particular feature of the present embodiment with respect to the embodiment previously described, in which, in stripping position, the moulding unit 1 covers the whole periphery of the lateral wall 12 of the pre-wind cavity 10, resides in that the mobile part 40 defines only the front part (considered in the direction of advance of the recipient) of the forming chamber 2 and covers, in stripping position, the front part of the lateral wall 12 of the pre-wind cavity 10. It should be noted that the front part of the lateral wind 12, front part covered by the mobile part 40 of the mould unit, is relatively thin and presents a thickness corresponding to the width of the inner shoulder 8 of the forming chamber 2. On the rest of the periphery, the lateral wall 12 of the pre-wind unit 9 may have a much greater thickness, similar to the thickness of the walls surrounding the forming chamber 2. In addition, the inner thickness 8 of the forming chamber 2 may be constituted by an inner vertical annular rib on the lateral wall 12 of the pre-wind unit 9 (left-hand side of FIGS. 16 to 18).

As in the preceding example, the pre-wind unit 9 is disposed directly below the moulding unit 1 in thermoforming position, in the immediate vicinity of the lower end of said moulding block 1. In certain cases, it is advantageous if the pre-wind unit 9 is rendered fast with the fixed part 39 of the moulding unit 1 or is made in one piece with said fixed part 39. In that case, almost vertical, lateral guiding elements 41 may be provided for the mobile part 40 of the moulding unit 1, which are not only made in the fixed part 39 of the moulding unit 1, but also in the corresponding part of the lateral wall 12 of the pre-wind unit 9. Of course, these guiding elements 41 are provided outside the path of advance of the thermoformed recipients. The mobile part 40 of the moulding unit 1 presents notches which are mounted by their base on a vertically mobile transverse bar and which serve to form the front part of the different forming chambers 2. The central part of the transverse bar may be borne by a vertical jack.

In the example shown in FIGS. 16 to 20, the forming chamber 2, the guiding chamber 23 of the pre-wind unit 9, the support rod 17 and the lateral face 18 of the shaping member 16 all have transverse sections which are inscribed in rectangles whose long sides are parallel to the direction of advance of the thermoplastics band and the recipients. The lateral face of the forming chamber 2 being vertical, the guiding elements 41 of the mobile part 40 of the moulding unit 1 must be almost vertical and be inclined downwardly and forwardly so that this mobile part 40 is adapted to cover a corresponding part of the vertical lateral wall 12 of the pre-wind cavity 10 by a descending vertical movement whilst moving away slightly forwardly from the front wall of the recipients which have just been thermoformed.

As may be seen more particularly in FIG. 19, the upper part of the shaping member 16 may present finger-shaped projections 42 which advance in the direction of the strongly curved parts of the lateral face 19 of the forming chamber 2 while leaving a sufficient clearance with respect to said lateral face, this clearance corresponding to the slot 21 having at least a thickness corresponding to that of the section 22. At the spot where the applicator fingers 42 of the shaping member 16 are placed, the inner shoulder 8 of the forming chamber may be interrupted at least over the whole height of the lateral face 18 of said shaping member 16.

As may be seen in particular in FIG. 20, the pre-wind cavity 10, i.e. the guiding chamber 23, is accessible from the outside through the vertical access slot 11 made in a horizontally mobile knife 43, constituting a part of the lateral face 15 of the pre-wind cavity 10 and cooperating with a fixed vertical knife 44 incorporated in the lateral wall 15 of said pre-wind cavity 10 so as to be flush with the lateral face 15 thereof. The edge of the mobile knife 43 is constituted by the outlet edge of the access slot 11, said edge located opposite the fixed knife 44. Of course, a pair of introduction rollers 14 (cf. for example FIG. 1) is disposed in front of the access slot 11.

The transfer piston 20 is not necessarily in the form of a continuous ring. A transfer piston may also be used, which is composed of a plurality of pieces or sectors of ring which are spaced apart from one another and provided only at the locations of the pre-wind cavity 10 where the parts of the lateral face 15 are strongly curved, i.e. present, seen in transverse section, curves with a low radius of curvature. Of course, these different pieces or sectors of the transfer piston are controlled simultaneously. The sectors or pieces of transfer piston are preferably provided plumb with the applicator fingers 42 of the shaping member 16.

As mentioned previously, each forming chamber 2 of the moulding unit 1 comprises at its base a continuous or discontinuous annular inner shoulder 8 of small width of which the inner edge defines the bottom opening 6 in said chamber 2. The transverse section of the bottom opening 6 coincides with the transverse section of the pre-wind cavity 10. The front part (FIG. 20) of the lateral wall 12 of the cavity 10 preferably has a thickness at the most equal to the maximum width of that part of the inner shoulder 8 located towards the mobile front part 40 of the moulding unit 1, this part of shoulder being immobile and, for example, fast with the fixed part 39 of the moulding unit 1. Of course, the shoulder 8 of each forming chamber 2 may be constituted by an inner part of the upper edge or of the upper end of the lateral wall 12 of the pre-wind cavity 10. In this case, the bottom opening 6 in the forming chamber 2 merges with the upper opening of the cavity 10.

In the moulding unit 1, the support rod 17 of the wall or bottom plate 7 possesses a transverse section similar to that of the pre-wind cavity 10 and determines with the lateral face 15 thereof the annular guiding chamber 23 for the section of web 22, the width of this annular guiding chamber 23 being equal at least to double the thickness of said section of web 22 and preferably to some millimeters. The lateral face of the bottom plate 7 is connected at its base to the lateral face of the guiding wall 34 which serves to enlarge the section of web 22, is of truncated or pyramidal form and narrows downwardly progressively and continuously towards the upper end of the support rod 17, the axial height of this guiding wall 34 being less than the maximum depth of penetration of the bottom plate 7 in the forming chamber 2. In the moulding unit 1, the transfer piston 22 made in one or more pieces comprises on its upper front face at least one rib 24 forming guiding lip applied against the lateral face 15 of the pre-wind cavity 10 and adapted to prevent an untimely enlargement of the lower edge of the section of web 22. When the moulding unit 1 is associated with one preforming punch per forming chamber 2, the descending movement of the bottom plate 7 may be synchronized with the descending movement of the preforming punch 29 at least in a second step, after the penetration thereof in the upper part of the forming chamber 2.

The operation for laying and preforming the section of web 22 is effected in the present case in similar manner to that of the embodiment shown in FIGS. 11 to 15. After the rise of the mobile part 40 of the moulding unit 1 into the high thermoforming position and after the introduction of the shaping member 16 in the median zone of the forming chamber 2 to form with the lateral face 19 thereof an annular slot 21 for passage, the transfer piston 20 expels the section of web 22 towards the additional guiding chamber 35 and then through the slot 21 into the upper part of the forming chamber 2 so that the section of web 22 is shaped at the level of the slot 21 and, after a slight withdrawal of the piston 20 (right-hand side of FIG. 18), the lower part of the section of web 22 is automatically applied against the lateral face 19 of the forming chamber 2. The shaping member 16 is then lowered as the overmoulding of the section of web 22 by the thermoplastics band progresses.

FIGS. 21 and 22 show a moulding unit 1 comprising two identical halves 45 and 46 of which the rear part 45 is fixedly installed in the high thermoforming position and whose frontal part 46 is mounted to move between the high thermoforming position and the low, so-called stripping position. The pre-wind unit is disposed, in the present case, directly beneath the moulding unit 1 in thermforming position, in the immediate vicinity thereof. The two parts 45 and 46 of the moulding unit 1 define a forming chamber 2 having a lateral face 19 of truncated or pyramidal form of which the apex is located towards the upper opening of the forming chamber 2. The mobile half 46 of the moulding unit 1 is adapted to cover part of the lateral wall 12 of the pre-wind unit 9 by a movement composed of a horizontal movement and of a descending vertical movement. Of course, during its horizontal movement, the mobile part 46 of the moulding unit 1 must move sufficiently for its opening 4 to be located outside the base of the truncated or pyramidal recipient which has just been thermoformed. When the forming chamber 2 is empty, the shaping member 16 may penetrate therein up to its median zone where it then defines with the lateral wall 19 the slot 21 for passage of the section of web 22.

Of course, the different embodiments which have been described hereinbefore may undergo a certain number of modifications without departing from the scope of protection as defined by the annexed Claims. For example, when the section of web does not extend over almost all the height, but only along the lower or upper part of the forming chamber, the slot 21 for passage should be made, not in the median zone of the forming chamber but in a part of the chamber which corresponds to the median or upper zone of positioning of the section of web in said forming chamber.

What is claimed is:

1. Device for laying and preforming a section of web, in a forming mould which is provided at a container thermoforming station, in a packing machine and which comprises a moulding unit having at least one upwardly open forming chamber, said open forming chamber being defined by at least one vertically movable part presenting, at its lower end, a bottom opening, said bottom opening having a transverse section, said bottom opening adapted to be closed by a bottom plate mobile with respect to said moulding unit of which at least a part is adapted to move vertically between a high, so-called thermoforming position and a low, so-called stripping position for the recipients, device of the type comprising:

a unit for pre-winding the section of web, said unit provided with a cylindrical pre-wind cavity having a lateral face, said pre-wind cavity open at least towards the forming chamber, adapted to be able to receive, laterally, a section of web and disposed so as to be located below the moulding unit and in alignment with said forming chamber which comprises at least one inner shoulder defining the bottom opening and extending perpendicularly to the vertical axis and towards the inside of said chamber at the most until it is plumb with said lateral face of the pre-wind cavity;

a shaping member which is mounted on a support rod and constituted by the bottom plate of said forming chamber, having a cylindrical lateral face of which the section at the bottom plate is similar to but less than the area of an end of said forming chamber, with the result that the distance between the lateral face of the shaping member and the lateral face of the forming chamber is at least equal to the thickness of the section of web, and which is adapted to penetrate into the forming chamber and to apply said section of web and to maintain it applied against the lateral face of said forming chamber, said shaping member, or bottom plate of said forming chamber being substantially axially midway of said forming chamber when said forming chamber occupies the so-called low or stripping position, said stripping position allowing said containers to be expelled from said mould, and a transfer member comprising a transfer piston connected to a control rod and mounted to slide in the pre-wind cavity about the rod and mounted to slide in the pre-wind cavity about the rod supporting the shaping member, wherein the shaping member is mounted to move between, on the one hand, a lower position corresponding either to the position of closing of the bottom opening in the forming chamber when the moulding unit occupies its high thermoforming position or to the median zone of the forming chamber when said unit occupies the stripping position and, on the other hand, an upper position corresponding to the median zone of said forming chamber when the moulding unit occupies the thermoforming position in that an annular slot for passage is defined between the lateral face defining the shaping member and certain corresponding parts of the lateral face of the forming chamber in a median thereof when the shaping member is located at the level of the median zone of the forming chamber, the thickness of the slot being at least equal to that of the section of web, and in that the transfer piston is adapted to penetrate in the forming chamber when the moulding unit is located immediately above the pre-wind cavity.

2. The device of claim 1, wherein the pre-wind unit is fixedly disposed in the immediate vicinity below the high thermoforming position of the moulding unit which is adapted to cover at least partially the lateral wall surrounding the pre-wind cavity when it is in stripping position.

3. The device of claim 1, wherein the pre-wind cavity is defined by a lateral wall whose periphery is inserted at least partially without noteworthy lateral clearance in the bottom of said transverse section of the bottom opening in the forming chamber.

4. The device of claim 1, wherein, in stripping position, the moulding unit covers the whole periphery of the lateral wall of the pre-wind cavity.

5. The device of claim 1 and associated with a forming mould of which the moulding unit comprises two lateral parts of which one is fixedly installed in the high, so-called thermoforming position and the other is mobile between the high, so-called thermoforming position and a low, so-called stripping position allowing the thermoformed recipient to leave laterally from the fixed part of the moulding unit, wherein the lateral wall of the pre-wind cavity is adapted to be covered, on a part of its periphery, by the mobile part of the moulding unit.

6. The device of claim 5, wherein the mobile lateral part of the moulding unit defines a part of a forming chamber with vertical face and is adapted to cover part of the periphery of the lateral wall of the pre-wind cavity by a vertical descending movement guided in vertical guides on the fixed part of the unit and the lateral wall of the pre-wind unit.

7. The device of claim 5, wherein the mobile lateral part of the moulding unit defines a half of the forming chamber having a lateral face of truncated or pyramidal form of which the apex is located towards the upper opening in the forming chamber, and is adapted to cover a part of the periphery of the lateral wall of the pre-wind cavity by a movement composed of a horizontal movement and a descending vertical movement.

8. The device of claim 1, wherein the inner shoulder defining the bottom opening in the forming chamber is constituted by the upper end of the lateral wall of the pre-wind cavity.

9. The device of claim 1, wherein the pre-wind unit is fast with the moulding unit and moves vertically therewith.

10. The device of claim 1, wherein the pre-wind unit is fast with the fixed part of the moulding unit.

11. The device of claim 1, in which the pre-wind cavity is accessible laterally through a vertical access slot made in a horizontally mobile knife and cooperating with a fixed vertical knife incorporated in the lateral wall of said pre-wind cavity flush with the lateral face thereof and in which a pair of introduction rollers is provided in front of the access slot, wherein the pair of introduction rollers is mounted on a carriage mobile horizontally between an introduction position located in the immediate vicinity of said access slot and a retracted position for which the free space between the pair of rollers and the lateral wall of the pre-wind cavity is sufficient to allow the moulding body to cover said wall.

12. The device of claim 1, in which the pre-wind cavity is accessible laterally through a vertical access slot made in the lateral wall defining said cavity, in which the support rod is constituted at the level of said cavity by a winding mandrel presenting a vertical row of suction orifices and in which a unit for introducing and cutting out sections of web is disposed in front of the access slot, wherein said introduction unit is mounted on a carriage horizontally mobile between a position of introduction located in the immediate vicinity of said access slot and a position of retraction, for which the free space between said unit and the lateral wall of the pre-wind cavity is sufficient to allow the moulding unit to cover said wall.

13. The device of claim 1, wherein the transfer piston comprises a front face provided with a guiding lip applied against the lateral face of the pre-wind cavity.

14. The device of claim 1, wherein the transfer piston comprises on its front face an annular groove defined by two lateral annular grooves forming guiding lips of which one is applied against the lateral face of the pre-wind cavity and of which the other bears against the support rod of the shaping member, the bottom of the groove being adapted to receive one of the edges of the section of web.

15. The device of claim 1, wherein the shaping member comprises below the bottom plate a truncated or pyramidal guiding wall connecting said bottom plate progressively and continuously to the upper end of the support rod, the height of the guiding wall of the shaping member being at least approximately equal to the depth of penetration of the shaping member in the forming chamber.

16. The device of claim 1, wherein the shaping member is mounted to move between its lower position and its upper position so as to remain immobile with respect to the lateral face of the forming chamber and to accompany the moulding unit in its ascending movement between the stripping position and the thermoforming position thereof.

17. The device of claim 1, wherein the support rod of the shaping member has transverse section similar to that of the pre-wind cavity and determines with the lateral face of said cavity an annular guiding chamber for the section of web, the thickness of this guiding chamber being equal at least to double the thickness of the section of web.

18. The device of claim 1, wherein the pre-wind unit comprises an upper part and a lower part, of which the upper part comprises a lateral wall which may be covered by the moulding unit and of which the lower part comprises in the lateral wall an access slot and serves to pre-wind the sections of web.

19. The device of claim 1, wherein the transfer piston is constituted by a plurality of sectors spaced apart from one another and provided at the locations of the pre-wind cavity where the parts of the lateral face are strongly curved.

20. A moulding unit provided in a station for thermoforming a row of containers from a thermoplastic band, provided with a plurality of upwardly open forming chambers of vertical axis, extending in a row transversely to the direction of advance of the thermoplastics band and presenting for each chamber a bottom plate mobile with respect to said lateral face defining said chamber so as to release a bottom opening, this moulding unit further being, on the one hand, subdivided into two parts of mould of which one, located to the rear in the direction of advance of the thermoplastics band and the thermoformed containers is immobile and fixedly installed in the thermoforming position, and of which the other, located towards the front in said direction of advance, is mounted to move between the high thermoforming position and a low, so-called stripping position in which the thermoformed containers may leave without obstacle the fixed mould part to the rear in the direction of advance of the thermoplastics band, and, on the other hand, associated with a device for preforming and depositing a section of web or wrapper, decorative or not, this device being disposed below the moulding unit and comprising shaping means provided with a pre-wind unit, means for cutting out a section of web from webs and means for transferring the section of web in the corresponding forming chamber, wherein:

the shaping means further comprise:
 (a) in the pre-wind unit, a cylindrical pre-wind cavity which is disposed coaxially to and directly below the corresponding forming chamber, which is open at least towards said forming chamber and which is defined by a lateral wall provided with a vertical slot for lateral access through which a section of web is introduced into said cavity of which the transverse section is inserted without noteworthy lateral clearance in the bottom of the forming chamber, and
 (b) in the forming chamber, the bottom plate which is vertically mobile between a low position in which it closes the bottom opening in said chamber and a high position in which its lateral face defines with the lateral face of said chamber a slot for passage between a lower part and an upper part of chamber, and which is mounted at the upper end of an axially mobile support rod, passing through the pre-wind cavity the width of said slot being at least equal to the thickness of the section of web,
 (c) in the pre-wind cavity, a transfer piston which is mounted to move between the lower end of said cavity and the forming chamber so as to be able to penetrate in the lower part thereof and the upper part forcing said section of web through said slot, pushing it by its lower edge, and wherein
the front part of the lateral wall of the pre-wind cavity is disposed inside the axial projection of the lateral face of the forming chamber so that it is adapted to be covered by the mobile front part of the moulding unit during the vertical descending movement thereof.

21. The moulding unit of claim 10, wherein the lateral wall defining the cavity of the pre-wind unit is fast with the immobile part of the moulding unit.

22. The moulding unit of claim 20 and in which the lower end of each forming chamber presents an inner shoulder of small width whose inner edge defines the bottom opening in said chamber, wherein the transverse section of the bottom opening coincides with that of the pre-wind cavity and the front part of the lateral wall of said cavity has a thickness at least equal to the maximum width of the part of the inner shoulder located towards the mobile front part of the moulding unit, this shoulder part being immobile.

23. The moulding unit of claim 22, wherein the inner shoulder of each forming chamber is constituted by the edge of the upper end of the lateral wall of the pre-wind cavity and the bottom opening of the forming chamber merges with the upper opening of said cavity.

24. The moulding unit of claim 20, wherein the support rod of the bottom plate possesses a transverse section similar to that of the pre-wind cavity and determines with the lateral face of said cavity an annular guiding chamber for the section of web, the thickness of this annular guiding chamber being equal at least to double the thickness of said section of web.

25. The moulding unit of claim 20, wherein the lateral face of the bottom plate is connected at the base to the lateral face of a guiding wall which serves to enlarge the section of web, is of truncated or pyramidal form and narrows downwardly in progressive and continuous manner towards the upper end of the support rod, the axial height of this guiding wall being less than the maximum depth of penetration of the bottom plate in the forming chamber.

26. The moulding unit of claim 20, wherein the transfer piston comprises on its upper front face at least one groove forming guiding lip applied against the lateral face of the pre-wind cavity and adapted to prevent an untimely enlargement of the lower edge of the section of web.

27. The moulding unit of claim 20 with which is associated one preforming punch per forming chamber, wherein the descending movement of the bottom plate is synchronized with the descending movement of the preforming punch, at least in a second step after the penetration of the latter in the upper part of the forming chamber.

* * * * *